July 26, 1966   C. W. LEGUILLON   3,262,479
CONCEALMENT MEANS FOR KEYS
Filed Oct. 20, 1964
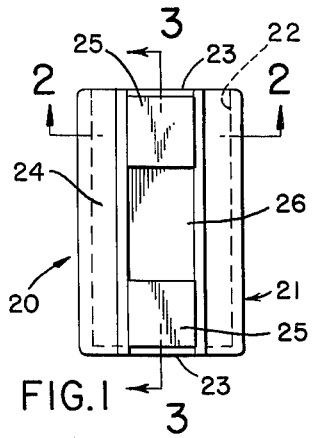
FIG. 1
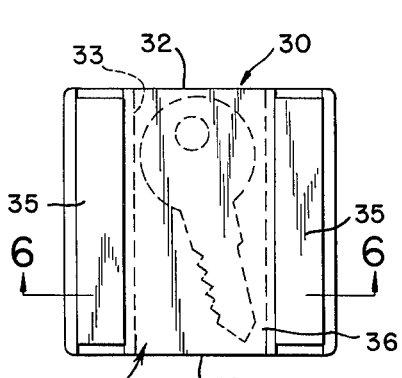
FIG. 3     FIG. 4
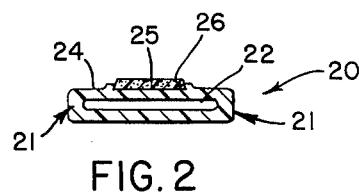
FIG. 2
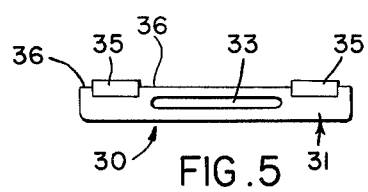
FIG. 5
FIG. 6
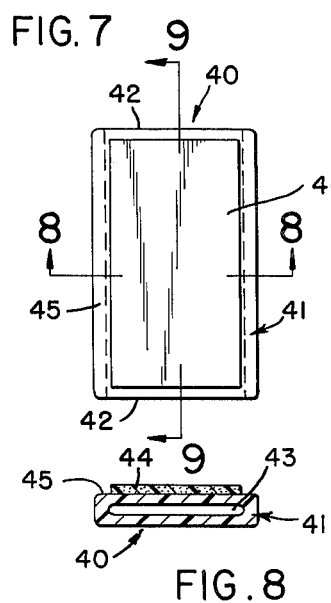
FIG. 7
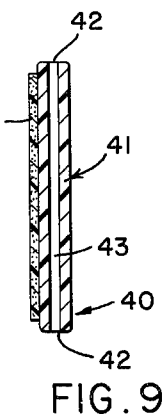
FIG. 9
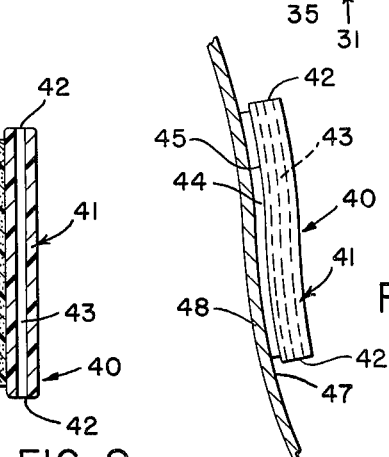
FIG. 10
FIG. 8
INVENTOR.
CHARLES W. LEGUILLON
BY
Willis F. Avery
ATTORNEY

United States Patent Office 3,262,479
Patented July 26, 1966

3,262,479
CONCEALMENT MEANS FOR KEYS
Charles W. Leguillon, 211 Overwood Road, Akron, Ohio
Filed Oct. 20, 1964, Ser. No. 405,188
3 Claims. (Cl. 150—40)

This invention relates to a means for concealing keys and more particularly to a means in which keys, such as a door key, an automobile key and the like, may be concealed in a place relatively near the lock operated by the key, but in a location not visible, or not readily visible, to one not knowing the location of the key.

In one of its preferred embodiments, the concealment means comprises a pocket for encasing a key, which pocket is flexible and distortionable and to an outer surface of which pocket one or more plastic magnets are attached, for contrast with a paramagnetic object having a surface to which the magnetic portion of the concealment means may be applied to hold the pocket and the key within it thereto.

It has heretofore been proposed to provide a key holder magnetically held to a metal surface of some part of an automobile but such holders have proved to be unsatisfactory, primarily because of the fact that the accessible out of sight metal surfaces of the automobile are not flat planes and hence the magnet portion of the holder does not contact the surface of the metal over a sufficient area to retain the key holder in place, because of the vertical and horizontal oscillations and vibrations due to rough conditions of the road surface, and especially upon a vigorous jarring of the automobile in passing over a bump or a hole in the roadway or when one of the doors of the automobile is closed with a bang, which is the normal way an automobile hood, trunk, dashboard and entrance doors are closed.

A primary object of this invention is to provide a concealment means for keys which will not become detached when applied to a non-planar surface, that is, a surface area made up at least in part of curved or other than even flat surfaces, of a supporting paramagnetic metal attached to and/or forming a part of a house or automobile, upon the jarring and/or vibration of the latter, as when a house door or one of the many automobile doors is slammed closed.

This object is attained by the utilization of a flexible, distortionable wall portion of a key holder to the outer surface of which the magnetic portions are attached, and hence allowing by distortion of the material of the pocket portion for the outer surface of the magnetic portions to be drawn into closer contact with the paramagnetic surface. For certain uses, as on curved paramagnetic surfaces, it is also desirable to have the magnetic portions composed of a plastic base which is distortionable to permit it to conform more closely to the surface of the supporting paramagnetic metal.

Other objects and advantages of this invention will become apparent during the course of the following description.

In the accompanying drawings:

FIG. 1 is a plan view of one form of my invention;

FIG. 2 is a cross sectional view taken on line 2—2 of FIG. 1;

FIG. 3 is a view in cross section taken on line 3—3 of FIG. 1 and showing the concealment means applied to a curved surface of a paramagnetic support.

FIG. 4 is a plan view of an embodiment of my invention;

FIG. 5 is an end view of the embodiment shown in FIG. 4;

FIG. 6 is a view in cross section taken on line 6—6 of FIG. 4, and showing the concealment means applied to a curved surface of a paramagnetic support;

FIG. 7 is a plan view of a further modification of my invention;

FIG. 8 is a cross-sectional view taken on line 8—8 of FIG. 7;

FIG. 9 is a view in cross section taken on line 9—9 of FIG. 7;

FIG. 10 is a side view of the embodiment shown in FIGS. 7 to 9 applied to a reversed curved surface of a paramagnetic metal support.

Referring to the drawings, wherein are shown some of the preferred embodiments of this invention for purposes of illustration, FIGS. 1 to 3 relate to one embodiment of the concealment means 20, wherein 21 indicates the flexible distortionable envelope which may be made of any suitable material, including extruded molded or dipped plastics, such as rubber, vinyl plastics, polyethylene, polystryrene, polyurethane and like plastics having readily flexible and distortionable properties, have been found to be preferable from the service and long-life standpoints, although it is to be understood the material of the envelope 21 is not limited to the above named plastics, but may be made of other readily flexible, distortionable materials. The envelope 21 which may be made by molding, dipping or extruding or otherwise, has a central space 22 having at least one opening 23 into the central space 22 for the insertion of a key, the flexible outer wall 24 being distored by the key when it is inserted within the central space 22 so as to hold the key securely within the envelope 21. The envelope 21 is preferably thin walled to be readily flexible and distortionable and has a wide outer surface 24 to which two or more magnets 25 are attached in any suitable manner, as widely spaced one from the other as shown in FIGS. 1 to 6. As shown in FIGS. 1 to 6, the magnets 25 are set in dove-tailed openings 26 in the outer surface 24 or the magnets may be adhered thereto as thin flexible magnetic strips as disclosed in FIGS. 7 to 10, later to be described.

In FIG. 3, the assembled concealment means 20 is shown in contact with a curved, or non-planar surface 27 of a paramagentic metal support 28, from which it will be noted that each of the magnetic portions 25 contact closely the non-planar surface 27 of the paramagnetic metal support 28, the envelope 21 being distorted sufficiently to permit the desired close contact of the magnets 25 to the curved or non-planar surface 27.

In repeated tests made of a concealment means of the character shown in FIGS. 1 to 3 of the drawing, when applied under dash to the non-planar paramagnetic metal of an automobile, the pull necessary to remove the concealment means was 12 ounces. Both the driving of an automobile to which the key holder means of FIGS. 1, 2 and 3 was magnetically supported for many weeks and the continued hard slamming of the automobile doors, and the doors of the dash board and trunk of the car, did not dislodge the concealment means, whereas key holders purchased on the market were readily dislodged by severe jarring.

In the embodiment shown in FIGS. 4 to 6, the concealment means 30 comprises a flexible distortionable envelope 31 having open ends 32—32, although it is to be understood that one of the ends 32 may be closed, leaving only one end 32 open for the introduction and removal of a key into and out of the central space 33. Two thin magnetic strips 35 extend longitudinally along opposite sides of an outer surface 36 of the envelope 31 and beyond the zone of the space 33 of the envelope 31, the magnetic strips being attached to the surface 36 in any suitable manner. When the concealment means 30 is applied to the non-planar curved surface 37 of the paramagnetic metal support 38, the envelope 31 is distorted sufficiently to permit the magnetic strips 35 to have surface contact with the paramagnetic support 38.

In FIGS. 7 to 10 is shown a modification of the invention in which the concealment means 40 comprises an envelope 41, preferably of an extrusionable distortionable plastic having open ends 42, although it is to be understood that one of the ends 42 may be closed leaving only one end open for introducing and removing the key from the central space 43. A thin flat flexible magnetic tape 44 is adhered to a wide surface 45 of the envelope 41. Both the envelope 41 and the magnetic tape 44 are distortionable enough to bring about a substantial area contact with surface 47 of the paramagnetic support 48 from one end of the tape 44 to the other, even where the paramagnetic metal support 48 presents reverse curve surfaces.

As is well known, the force of magnetic attraction is increased by increased surface contact. It has been demonstrated by tests that a relatively thin, but wide, magnetic tape serves effectively to hold the envelope 41 firmly to the paramagnetic metal 48.

It is to be understood that the several embodiments herein shown and described are examples of the invention of this application, and that various changes in materials and in size, shape and relative arrangement of parts may be included in the invention of this application without departing from the spirit of this invention or the scope of the following claims.

What I claim is:

1. In a holder for keys capable of being magnetically held firmly to an underside of a non-planar surface of a paramagnetic metal support, in combination, an envelope comprising two distortionable side walls spaced from each other sufficiently to hold a key between them and joined to each other at their margins except for openings at the ends for the entrance and exit of a key, and two plastic magnetic strips attached to an outer surface of one of the said distortionable side walls and spaced each from the other so as to leave the wall between the plastic magnetic strips free to distort under pressure, whereby the distortion of the wall between the two magnetic strips enables each of the said strips to contact the non-planar surface of the support in a different plane one from the other.

2. In a holder for keys capable of being magnetically held firmly to an under side of a non-planar surface of a paramagnetic metal support, in combination, an envelope comprising two distortionable side walls spaced from each other sufficiently to hold a key between them and joined to each other at their margins except for an opening at one of the ends for the entrance and exit of a key, and two relatively thin distortionable magnetic elements each attached to an outer surface of one of the said distortionable side walls and spaced from each other so as to leave a substantial portion of the wall between the two magnetic elements free to flex and to distort under pressure.

3. In a key container capable of being magnetically held firmly to an under side of a non-planar surface of a paramagnetic support, in combination, a readily flexible and distortionable walled envelope having a pocket therein suitable for containing a key and means for the insertion of the key into said pocket, and a plurality of magnetic elements attached to the outer side of a wide readily flexible and distortionable wall of said envelope and spaced each from the other so as to leave the wall between the magnetic elements free to readily flex and distort under pressure, whereby the flexing and distortion of the said wall enables each of the magnetic elements to contact the non-planar surface of the paramagnetic support in different planes one from another.

References Cited by the Examiner
UNITED STATES PATENTS

| | | | |
|---|---|---|---|
| 2,589,349 | 3/1952 | Diefenbach | 248—206 |
| 3,007,568 | 11/1961 | Kurland | 150—40 |
| 3,212,546 | 10/1965 | Lind | 150—40 |

JOSEPH R. LECLAIR, *Primary Examiner.*